United States Patent [19]
Doyle et al.

[11] Patent Number: 5,353,431
[45] Date of Patent: Oct. 4, 1994

[54] MEMORY ADDRESS DECODER WITH STORAGE FOR MEMORY ATTRIBUTE INFORMATION

[75] Inventors: Patrick F. Doyle, Hillsboro; Leonard W. Cross, Beaverton; Roger Noar, Tigard, all of Oreg.

[73] Assignee: Intel Corporation, Santa Clara, Calif.

[21] Appl. No.: 193,516

[22] Filed: Feb. 8, 1994

Related U.S. Application Data

[63] Continuation of Ser. No. 692,483, Apr. 29, 1991, abandoned.

[51] Int. Cl.$^5$ .............................................. G06F 12/02
[52] U.S. Cl. ..................................... 395/425; 395/400; 364/DIG. 1; 364/239.4
[58] Field of Search ... 364/200 MS File, 900 MS File; 395/400, 425

[56] References Cited

U.S. PATENT DOCUMENTS

| | | | |
|---|---|---|---|
| 4,701,878 | 10/1987 | Günkel et al. | 395/325 |
| 4,821,182 | 4/1989 | Leininger | 395/425 |
| 4,905,142 | 2/1990 | Matsubara et al. | 395/425 |
| 4,905,184 | 2/1990 | Giridhar et al. | 395/400 |

*Primary Examiner*—Joseph L. Dixon
*Assistant Examiner*—Hiep T. Nguyen
*Attorney, Agent, or Firm*—Blakely, Sokoloff, Taylor & Zafman

[57] ABSTRACT

A programmable and testable memory address decoder for a computer system where a static random access memory device is used to store memory configuration information. The computer system includes a processor which is coupled to the memory address decoder via data and address lines. The memory address decoder includes an SRAM for storing a memory map which associates memory attributes with memory ranges or blocks of memory. The memory attributes include: memory residence, caching, write protection of memory ranges, and the decoding of other memory modules. The present invention also includes control logic, a read-back register, and a mode register for controlling the loading and read back verification of the SRAM. The control logic operates the memory address decoder in one of four modes. These modes include: 1) power-up mode, 2) programming mode, 3) read back mode, and 4) normal operation mode. One of these modes is selected by loading the mode register with a value corresponding to the desired mode. A default power up mode is entered after power is first applied to the computer system. When the processor specifies a programming mode, the processor may write data directly into the SRAM. When the processor specifies the read back mode, the contents of the SRAM may be read back by the processor through the read back register. A normal mode may be entered in order to enable access to system memory (DRAM) with memory attribute information.

25 Claims, 2 Drawing Sheets

MEMORY ADDRESS DECODER WITH STORAGE FOR MEMORY ATTRIBUTE INFORMATION

This is a continuation of application Ser. No. 07/692,483 filed Apr. 29, 1991, now abandoned.

FIELD OF THE INVENTION

The present invention relates to computer systems. Specifically, the present invention relates to memory interface, decode and control mechanisms for use in a computer system.

BACKGROUND OF THE INVENTION

The increased speed of computers today and the increased complexity of the associated memory system requires increased performance, flexibility, automation, and testing ability in the system memory decoder. A memory system coupled to a typical computer system may have numerous system memory configurations of different size memory devices and a variety of memory attribute information including attributes associated with a central processing unit (CPU) internal cache, attributes associated with a CPU external cache, attributes associated with the write protection of particular segments of memory within the memory system, and a memory map for associating memory addresses with physical locations within the memory system. Other types of memory configuration information may be significant in other computer systems or as a particular computer system increases in complexity.

Many prior art computer systems use switches or jumpers to define memory size, location, or other memory attributes. Clearly, switches or jumpers retain memory attribute definition even though the computer system loses power; however, switches and jumpers are inconvenient to configure and cannot be automatically configured. Further, configuring switches or jumpers typically requires access to a circuit board inside the computer system.

Other computer systems dynamically determine their memory system configurations on power up initialization of the computer system. As memory systems get more complex, however, this procedure can be very time consuming. Other computer systems employ a non-volatile memory device for retaining memory configuration information. In this way, a manufacturer or user of the computer system does not need to manipulate a set of switches or jumpers and the computer system does not need to dynamically determine its configuration at power up initialization. Further, during normal operations of the computer system, the non-volatile memory configuration information can be rapidly accessed and used by the memory decoder or memory controller. Non-volatile memory, however, is not easily modified when the memory configuration of the computer system changes. Typically, the non-volatile memory device must be removed from a circuit board of the computer system and replaced with a non-volatile memory device containing an updated version of the memory configuration information. This replacement of a non-volatile memory device is time consuming, expensive, and likely to introduce other problems during the manipulation of the circuit board. Further, the non-volatile memory configuration information cannot be modified by the processing logic during operation of the computer system. Prior art systems do not provide a means for reading and verifying the content of a memory configuration storage means.

A better method is needed for storing, manipulating, and verifying memory configuration information in a computer system.

SUMMARY OF THE INVENTION

The present invention is a programmable and testable memory address decoder for a computer system where a memory means is used for storing memory configuration information. The present invention includes means for verifying the contents of the static random access memory device. The computer system includes a processor which is coupled to the memory address decoder via data and address lines. The processor makes access to system memory, typically dynamic random access memory (DRAM) through the memory address decoder.

The memory address decoder includes a memory means for storing system memory attribute information. In the preferred embodiment, the memory means is a static random access memory (SRAM). The SRAM stores a memory map which associates memory attributes with memory ranges or blocks of memory. The following memory attributes are among those that can be so associated: memory residence (on board or off board memory), the ability of the associated block of system memory to be cached (internal cache, external cache, or cache disabled), write protection of memory ranges, and the decoding of single in-line memory modules (SIMM). The SRAM uses only the most significant portion of the CPU address lines. Thus, the address presented to the SRAM corresponds to a range or block of system memory addresses. Each bit at a given memory address of the SRAM defines the state of a memory attribute associated with the corresponding block of system memory.

The present invention also includes control logic, a read-back register, and a mode register for controlling the loading and read back verification of the SRAM. The memory address decoder also includes a non-volatile memory device which contains embedded firmware comprising processing logic and non-volatile data used for testing and programming the memory address decoder.

The programming (i.e. loading) of the SRAM and read-back register is controlled by a state machine located within the control logic. The control logic operates the memory address decoder in one of four modes. These modes include: 1) power-up mode, 2) programming mode, 3) read back mode, and 4) normal operation mode. One of these modes is selected by loading the mode register with a value corresponding to the desired mode. The operation of the memory address decoder in each of these four modes is controlled by the control logic.

Both the mode register and the read back register are coupled to an I/O bus. The processor of the computer system may access either the mode register or the read back register by issuing an I/O instruction with a distinct address associated with each of the registers. Two bits in the mode register specify one of four operating modes of the control logic.

A default power up mode is entered after power is first applied to the computer system of the present invention. In power up mode, the control logic forces the SRAM into a high impedance output state and any special interpretation of CPU commands by the control logic is prevented. In power up mode, the SRAM is neither used as a decoder nor programmed by the control logic. Output of memory attribute information is disabled. After power up, a different mode may be entered after the processor loads the mode register with a value corresponding to one of the other available modes.

When the processor loads the mode register with a value corresponding to a programming mode, the processor may write directly into the SRAM by performing a memory write operation. Data is presented to the SRAM via data lines through a buffer. The address of the SRAM location into which each data item is loaded is specified by the address lines. At the completion of each memory write cycle, the control logic generates a ready signal for the processor. The processor can thereafter set up for next memory write cycle. Memory write cycles may continue until the contents of the SRAM have been completely loaded.

The processor specifies the read back mode by loading the corresponding bits into the mode register. The contents of the SRAM may then be read back by the processor through the read back register. Reading back the contents of the SRAM is a two step process. The processor first performs a memory write operation after specifying read back mode by loading the mode register. The read back register may then be read by the processor using an I/O instruction with an address corresponding to the I/O space address of the read back register. The entire contents of the SRAM may be verified by the processor using multiple memory write and I/O read cycles of the contents of the read back register for each address in the SRAM.

The fourth mode of operation of the memory address decoder of the present invention, is the normal decoder operation mode. After the SRAM contents have been loaded and verified using programming and read back modes, a normal mode may be entered in order to enable access to system memory (DRAM) using memory attribute information. In the normal mode, the SRAM memory attribute information is provided system DRAM control logic for all memory cycles. In normal mode, the memory address decoder control logic prevents SRAM programming or related activities. Memory attribute information and associated signals are thereby enabled by entry into a normal operation mode. Devices external to the memory address decoder thereby gain access to memory residence information, CPU caching ability information, write protection information, and memory module physical location information, and external caching ability information, for particular address ranges as specified by the contents of the SRAM.

It is therefore an object of the present invention to provide a means for storing memory configuration information without the use of switches or jumpers. It is a further object of the present invention to provide a means for improving the prior art method of storing memory configuration information in a non-volatile memory device. It is a further object of the present invention to provide a means for storing memory configuration information with a means for testing the validity of the stored memory configuration information. It is a further object of the present invention to provide a means for improving the speed by which the computer system may access memory configuration information during normal operations.

These and other objects of the present invention will become apparent as presented and described in the following detailed description of the preferred embodiment.

DETAILED DESCRIPTION OF THE PREFERRED EMBODIMENT

The present invention is a programmable and testable memory address decoder for a computer system where a memory means is used for storing memory configuration information. The present invention includes a means for verifying the contents of the static random access memory device. In the following description, numerous specific details are set forth in order to provide a thorough understanding of the invention. However, it will be apparent to those of ordinary skill in the art that these specific details need not be used to practice the present invention. In other instances, well known structures, circuits, and interfaces have not been shown in detail in order to not to unnecessarily obscure the present invention.

Figure 1:
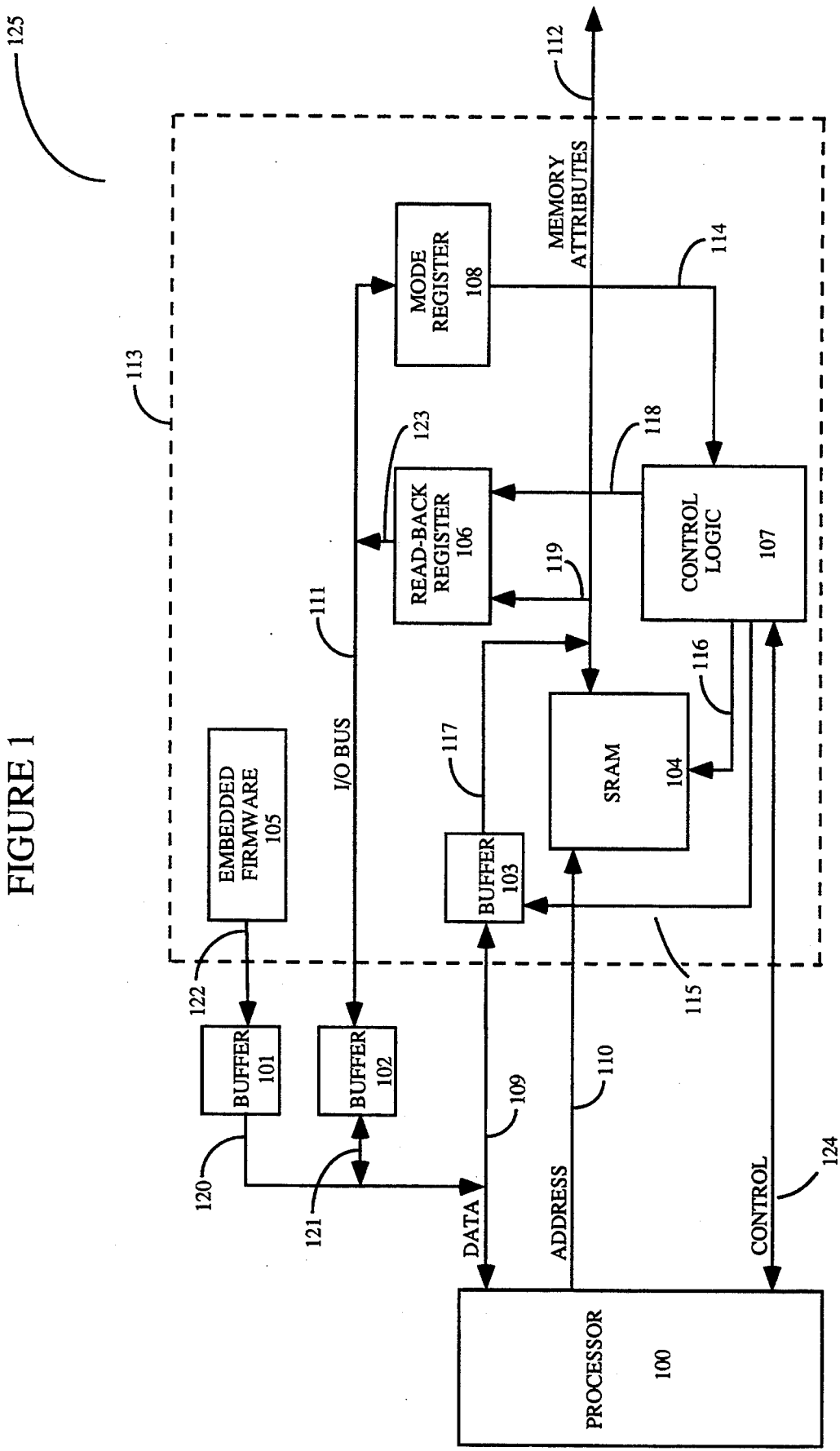
FIG. 1 is an illustration of the memory address decoder of the present invention.

Referring to FIG. 1, a block diagram of the architecture of the memory address decoder of the present invention is illustrated. A processor 100 is shown coupled to memory address decoder 113 via data lines 109 and address lines 110. In the preferred embodiment, processor 100 is a microprocessor, specifically an 80486 manufactured and distributed by the Assignee of the present invention. Processor 100 makes access to system memory, typically dynamic random access memory (DRAM) through memory address decoder 113.

Memory address decoder 113 includes a memory means or storing system memory attribute information. In the preferred embodiment, the memory means is a static random access memory (SRAM) 104. SRAM 104 stores a memory map which associates memory attributes with memory ranges or blocks of memory. This association provides a flexible memory map with little restraint on attributes assigned to a given address range. The following memory attributes are among those that can be so assigned: memory residence (on board or off board memory), the ability of system memory to be cached (internal cache, external cache, or cache disabled), write protection of memory ranges, and the decoding of single in-line memory modules (SIMM). The design and use of SIMMs is well known to those of ordinary skill in the art. It will also be apparent to those skilled in the art that other memory attribute information may also be associated with blocks of memory using the present invention. SRAM 104 uses only the most significant portion of CPU address lines presented on line 110. Thus, the address presented to the SRAM 104 corresponds to a range or block of system memory addresses. In the preferred embodiment, address lines 15 through 27 are input to SRAM 104 by an address receiving means. Each bit at a given memory address of SRAM 104 defines the state of a memory attribute associated with the corresponding block of system memory. Because the lower address lines are not input to SRAM 104, a given entry within SRAM 104 applies to an address range (i.e. an address range where the upper address lines are equal). The granularity of the address range is determined by the address lines connected to SRAM 104. In the preferred embodiment of the present invention, a 32 KB granularity is provided which covers memory addresses up to 256 MB. Note that each address in the i80486 architecture of the preferred embodiment accesses one byte of data.

Figure 2:
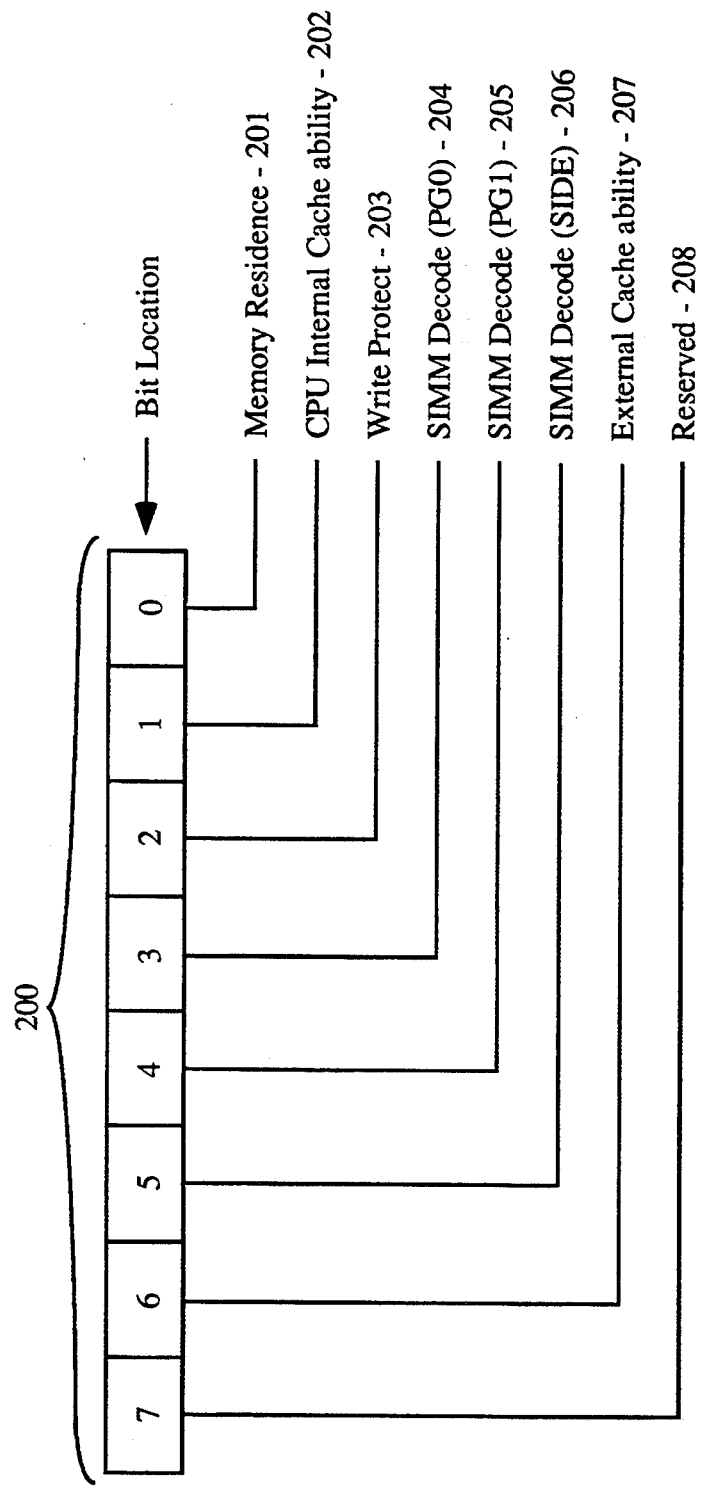
FIG. 2 is an illustration of the contents of the memory means of the memory address decoder of the present invention.

Referring now to FIG. 2, the bit assignment for locations in SRAM 104 is illustrated. In the preferred embodiment, each location 200 in SRAM 104 is an eight bit wide data item defining memory attribute information associated with the address input to SRAM 104 on line 110. Each bit of SRAM location 200 corresponds to a particular memory attribute. Bit zero corresponds to memory residence information 201. Memory residence information indicates whether a given block of memory resides in a local memory array or an external memory area. If the memory residence bit is active (high), the 32 KB range of memory associated with the input address resides in a local memory array. In the preferred embodiment, the local memory array corresponds to memory on the system board of the computer system. If the memory residence bit is inactive (low), the corresponding 32 KB range of memory resides in an external memory area. In the preferred embodiment, the external memory area is an EISA expansion board. Such EISA expansion boards are well known in the art.

Bit one of SRAM location 200 corresponds to the CPU internal caching ability attribute. The CPU internal caching ability bit acts as a cache enable for the CPU internal cache. If the CPU internal caching ability bit is active (low), an enable signal is asserted to allow the internal cache to reflect the contents of the given memory range. If bit one is inactive (high), the memory range associated with SRAM location 200 is not cached whether or not the associated memory range resides in local or external system memory.

Bit two of SRAM location 200 corresponds to a write protect attribute. The write protect bit (active low) allows a range of system memory to be write protected. If a write operation occurs within this address range and the operation is performed on local system memory, a normal memory cycle is run with the exception of the column address strobe (CAS) strobe signal to the system DRAM. For a write access to a protected memory range, the CAS signal is not asserted. Write protected addresses are not cached in the preferred embodiment of the present invention.

Bits three, four, and five of SRAM location 200 correspond to the physical configuration of single in-line memory modules (SIMMs). The use of a SIMM in a computer system is well known to those of ordinary skill in the art. In the preferred embodiment, three SRAM bits are used to define one of eight different configurations of SIMMs. In the preferred embodiment, single-sided or double-sided SIMMs may be inserted into one of four memory banks thereby producing eight different configurations. Each of the eight different configurations requires a unique memory control (i.e. row address strobe or RAS) and must be decoded using the three SIMM decode attribute bits in SRAM location 200. SIMM decode bits three and four correspond to a specific bank in the computer system. SIMM decode bit five corresponds to a specific side of a SIMM. It will be apparent to those skilled in the art that a greater or lesser number of bits may be provided for storing memory attribute information associated with the physical configuration of memory modules or SIMMs.

Bit six of SRAM location 200 corresponds to an external caching ability bit. The external caching ability bit is similar to the CPU internal caching ability bit, except that the external caching ability bit controls the external cache of a computer system employing the present invention. If the external caching ability bit 207 is active (low), the external cache is enabled and may reflect the memory contents of a specific 32 KB address range associated with SRAM location 200. If external caching ability bit 207 is inactive (high), the associated memory range is not cached by the external cache of the computer system. In the preferred embodiment, bit seven of SRAM location 200 is reserved for other types of memory attribute information. It will be apparent to those skilled in the art that additional memory attribute information may be encoded into SRAM 104 without departing from the scope of the present invention.

Referring again to FIG. 1, memory attributes may be read from SRAM 104 over line 112 for a corresponding address input to SRAM 104 via line 110. Memory attributes are typically read from SRAM 104 by a DRAM controller that controls the operation of system memory. Having described the contents of SRAM 104, a means and method for programming (i.e. loading) the contents of SRAM 104 is described in the following section.

Information stored in the SRAM 104 is lost each time the computer system is powered down. At power up, the contents of SRAM 104 must be restored. The present invention includes control logic 107, read-back register 106, and mode register 108 for controlling the loading and read back verification of SRAM 104. Memory address decoder 113 also includes a non-volatile memory device 105 which contains embedded firmware comprising processing logic and non-volatile data used for testing and programming memory address decoder 113. Embedded firmware in non-volatile memory device 105 is used for automatically configuring the memory address decoder 113 according to processing logic and/or non-volatile configuration data stored in non-volatile memory device 105.

The programming of SRAM 104 and read-back register 106 is controlled by a state machine located within control logic 107. The state machine of control logic 107 operates the memory address decoder 113 in one of four modes. These modes include: 1) power-up mode, 2) programming mode, 3) read back mode, and 4) normal operation mode. Modes 1-3 rely on predefined minimal attribute definitions when the SRAM 104 outputs do not reflect the memory system configuration. One of these modes is selected by loading mode register 108 with a value corresponding to the desired mode. The operation of memory address decoder 113 in each of these four modes is controlled by control logic 107. In the preferred embodiment of the present invention, control logic 107 is implemented using programmed logic arrays or PLAs.

Referring again to FIG. 1, two registers are included in the memory address decoder 113. A mode register 108 provides a means by which processor 100 may specify one of the four available modes for control of the state machine within control logic 107. A read back register 106 allows processor 100 to read back the contents of SRAM 104 at specified locations. A detailed description of the operation of read back register 106 during read back mode is described below. A detailed description of mode selection using the mode register is presented next.

Both mode register 108 and read back register 106 are coupled to an I/O bus 111. Processor 100 may access either mode register 108 or read back register 106 by issuing an I/O instruction with a distinct address associated with each of the registers 108 and 106. Means for programming and reading I/O registers in the I/O space of the computer system is well known to those of ordinary skill in the art.

Two bits in mode register 108 specify one of four operating modes of control logic 107. Once a mode is stored in mode register 108 by processor 100, control logic 107 receives these mode bits via line 114. A default power up mode is entered after power is first applied to the computer system of the present invention. Since the contents of SRAM 104 and I/O registers in memory address decoder 113 are volatile, the contents of SRAM 104 are uninitialized and mode register 108 is cleared. Thus, control logic 107 defaults to the power up mode where SRAM 104 is forced into a high impedance output state and any special interpretation of CPU commands by control logic 107 is prevented. In power up mode, SRAM 104 is neither used as a decoder nor programmed by control logic 107. Output of memory attribute information is disabled. After power up, a different mode may be entered after processor 100 loads mode register 108 with a value corresponding to one of the other available modes.

When processor 100 loads mode register 108 with a value corresponding to a programming mode, processor 100 may write directly into SRAM 104 by performing a memory write operation. In programming mode, control logic 107 will interpret processor 100 memory write cycles as SRAM 104 programming cycles through control lines 124. During a memory write cycle in this mode, control logic 107 generates a RAM write enable signal on line 116 to SRAM 104 to strobe data into SRAM 104. Data is presented to SRAM 104 via data lines 109 through buffer 103 and lines 117. Buffer 103 is enabled by control logic 107 through line 115 for each write cycle. The address into which each data item is loaded is specified by address lines 110. At the completion of each memory write cycle, control logic 107 generates a ready signal on control lines 124 back to processor 100. Processor 100 can thereafter set up for next memory write cycle. In the preferred embodiment, an additional signal is provided by control logic 107 to an EISA bus controller that specifies that the memory write cycle in programming mode is not an EISA cycle. Memory write cycles may continue until the contents of SRAM 104 have been completely loaded.

Processor 100 specifies the read back mode by loading the corresponding bits in mode register 108. The contents of SRAM 104 may be read back by processor 100 through read back register 106. Reading back the contents of SRAM 104 is a two step process. Processor 100 first performs a memory write operation after specifying read back mode by loading mode register 108. During the memory write cycle while in read back mode, data is latched from SRAM 104 into read back register 106 on line 119. Read back register 106 may then be read by processor 100 using an I/O instruction with an address corresponding to the I/O space address of read back register 106. Read back register 106 latches data during the write cycle using a write strobe provided by control logic 107 via line 118. Control logic 107 also generates a ready signal on line 124 to terminate the memory write cycle in read back mode. Read back register 106 may be read by processor 100 at any later time in order to verify the contents of SRAM 104. Read back register 106 holds only the single most recent byte read from SRAM 104. The entire contents of SRAM 104 may be verified by processor 100 using multiple memory write and I/O read cycles of the contents of read back register 106 for each address in SRAM 104. In the preferred embodiment, in order to completely load and/or verify the contents of SRAM 104, 8192 write cycles must be executed. It will be apparent to those skilled in the art that a different size SRAM 104 may be supported thereby requiring a different number of memory write cycles.

The fourth mode of operation of the memory address decoder 113 of the present invention, is the normal decoder operation mode. After SRAM 104 contents have been loaded and verified using programming and read back modes, a normal mode may be entered in order to enable access to system memory (DRAM) using memory attribute information. In the normal mode, SRAM 104 outputs on line 112 are enabled by an active signal from control logic 107 to SRAM 104 via line 116. Once enabled, memory attribute information is provided on line 112 to DRAM control logic for all memory cycles. In normal mode, control logic 107 prevents SRAM 104 programming or related activities. Memory attribute information and associated signals are thereby enabled by entry into a normal operation mode. Devices external to memory address decoder 113 thereby gain access to memory residence information, CPU caching ability information, write protection information, and memory module physical location information, and external caching ability information, for particular address ranges as specified by the contents of SRAM 104.

Thus, an improved memory address decoder for storing memory attribute information with a means for reading back and verifying the contents of SRAM is disclosed.

Although the invention has been described herein with reference to a specific embodiment, many modifications and variations therein will readily occur to those skilled in the art. Accordingly, all such variations and modifications are included within the intended scope of the present invention as defined by the following claims.

We claim:

1. An improved memory address decoder comprising: means for receiving addressing signals;
    memory means for storing a Software programmable memory map, said memory means coupled to said receiving means, said memory map for storing memory attribute information associated with said addressing signals received by said receiving means, said memory attribute information for defining at least one state of a plurality of memory attributes associated with a corresponding block of system memory indicated by said addressing signals;
    control logic coupled to said memory means for controlling access to said memory means and controlling an output of said memory attribute information from said memory means, said control logic further including means for programming said software programmable memory map according to at least one processor instruction; and
    means for outputting said memory attribute information, said means for outputting coupled to said memory means.

2. The improved memory address decoder as claimed in claim 1 further including means for reading the content of said memory means, said means for reading coupled to said memory means.

3. The improved memory address decoder as claimed in claim 2 wherein said means for reading further including a read-back register for storing the content of a location in said memory means while said location is being read.

4. The improved memory address decoder as claimed in claim 2 further including:
means for receiving mode information; and
a mode register coupled to said means for receiving mode information and said control logic, said mode register for storing mode information received by said means for receiving mode information, said mode information read by said control logic, said means for reading the contents of said memory means activated when said mode information indicates a read back mode.

5. The improved memory address decoder as claimed in claim 1 further including:
means for receiving mode information; and
a mode register coupled to said means for receiving mode information and said control logic, said mode register for storing mode information received by said means for receiving mode information, said mode information read by said control logic.

6. The improved memory address decoder as claimed in claim 5 wherein said control logic further includes means for disabling the output of said memory attribute information from said memory means, said means for disabling being activated when said mode information indicates a power-up mode.

7. The improved memory address decoder as claimed in claim 4 wherein said means for programming is activated when said mode information indicates a programming mode.

8. The improved memory address decoder as claimed in claim 5 wherein said control logic further includes means for enabling the output of said memory attribute information from said memory means, said means for enabling being activated when said mode information indicates a normal operation mode.

9. The improved memory address decoder as claimed in claim 1 further including non-volatile memory means for storing processing logic and memory configuration data.

10. The improved memory address decoder as claimed in claim 1 wherein said memory means is a static random access memory device.

11. The improved memory address decoder as claimed in claim 1 wherein said plurality of memory attributes includes memory residence information.

12. The improved memory address decoder as claimed in claim 1 wherein said plurality of memory attributes includes write protection information.

13. The improved memory address decoder as claimed in claim 1 wherein said plurality of memory attributes includes internal cache information.

14. The improved memory address decoder as claimed in claim 1 wherein said plurality of memory attributes includes external cache information.

15. The improved memory address decoder as claimed in claim 1 wherein said plurality of memory attributes includes memory module configuration information.

16. A process for decoding addressing signals, said process comprising the steps of:
receiving addressing signals;
accessing a software programmable memory map stored in a memory means, said memory map for storing memory attribute information associated with said addressing signals received in said receiving step, said memory attribute information for defining at least one state of a plurality of memory attributes associated with a corresponding block of system memory indicated by said addressing signals;
reading a mode register to determine mode information;
programming said software programmable memory map according to at least one processor instruction when said mode information indicates a programming mode; and
outputting said memory attribute information when indicated by said mode information.

17. The process as claimed in claim 16 further including a step of reading the contents of said memory means when said mode information indicates a read-back mode.

18. The process as claimed in claim 16 further including a step of reading processing logic and memory configuration data stored in a non-volatile memory means.

19. The process as claimed in claim 16 wherein said accessing step further includes a step of reading memory residence information stored in said memory means.

20. The process as claimed in claim 16 wherein said accessing step further includes a step of reading write protection information stored in said memory means.

21. The process as claimed in claim 16 wherein said accessing step further includes a step of reading internal cache information stored in said memory means.

22. The process as claimed in claim 16 wherein said accessing step further includes a step of reading external cache information stored in said memory means.

23. The process as claimed in claim 16 wherein said accessing step further includes a step of reading memory module configuration information stored in said memory means.

24. The process as claimed in claim 16 wherein said outputting step further includes a step of disabling the output of said memory attribute information when said mode information indicates a power-up mode.

25. The process as claimed in claim 16 wherein said outputting step further includes a step of enabling the output of said memory attribute information when said mode information indicates a normal operation mode.

* * * * *

UNITED STATES PATENT AND TRADEMARK OFFICE
CERTIFICATE OF CORRECTION

PATENT NO.    : 5,353,431

DATED         : October 4, 1994

INVENTOR(S)   : Doyle et al.

It is certified that error appears in the above-identified patent and that said Letters Patent is hereby corrected as shown below:

In column 9 at line 39 delete "claim 4" and insert --claim 5--

Signed and Sealed this

Twenty-third Day of July, 1996

Attest:

BRUCE LEHMAN

Attesting Officer

Commissioner of Patents and Trademarks